United States Patent
Gilgur et al.

(10) Patent No.: US 9,584,419 B1
(45) Date of Patent: Feb. 28, 2017

(54) SYSTEMS AND METHODS FOR DETECTING CONSISTENT FABRIC CONGESTION IN A DATACENTER BASED ON HISTORICAL TRAFFIC DATA

(71) Applicant: Google Inc., Mountain View, CA (US)

(72) Inventors: Alexander Gilgur, Sunnyvale, CA (US); Harpreet S. Chadha, San Jose, CA (US)

(73) Assignee: Google Inc., Mountain View, CA (US)

( * ) Notice: Subject to any disclaimer, the term of this patent is extended or adjusted under 35 U.S.C. 154(b) by 61 days.

(21) Appl. No.: 14/661,901

(22) Filed: Mar. 18, 2015

(51) Int. Cl.
*H04W 4/00* (2009.01)
*H04L 12/801* (2013.01)
*H04L 12/26* (2006.01)

(52) U.S. Cl.
CPC .......... *H04L 47/11* (2013.01); *H04L 43/0888* (2013.01); *H04L 43/0894* (2013.01); *H04L 43/50* (2013.01); *H04L 47/12* (2013.01)

(58) Field of Classification Search
CPC ......... H04L 47/11; H04L 47/12; H04L 43/50; H04L 43/0888; H04L 43/0894
See application file for complete search history.

(56) References Cited

U.S. PATENT DOCUMENTS 6,813,244 B1 * 11/2004 He ............... H04L 12/2697 370/235
8,089,884 B2 * 1/2012 Liu ............... H04L 45/026 370/237
8,880,682 B2    11/2014 Bishop et al.
2008/0056125 A1 * 3/2008 Kneckt ............ H04L 12/24 370/229

(Continued)

FOREIGN PATENT DOCUMENTS

| CN | 102893654 | 1/2013 |
| WO | WO-2011/144061 | 11/2011 |
| WO | WO-2014/179508 | 11/2014 |

OTHER PUBLICATIONS

Bonald et al., Internet and the Erlang Formula, ACM SIGCOMM Computer Communication Review, vol. 42, No. 1, pp. 24-30, Jan. 2012.

(Continued)

*Primary Examiner* — Phuc Tran
(74) *Attorney, Agent, or Firm* — McDermott Will & Emery LLP (57) ABSTRACT

Detecting network congestion at a network device by collecting, for various time intervals, measurements of a quantifiable characteristic of traffic transiting the network device at a plurality of respective measurement times during each of the time intervals. Described systems and methods select two or more sets of measurements, each set corresponding to a respective time interval; determine, for each of the selected sets of measurements, respective upper and lower boundaries for the quantifiable characteristic during the respective time interval; and analyze trends for a time window inclusive of the time intervals corresponding to the selected sets of measurements, the trends including an upper boundary trend and a lower boundary trend. Congestion is then identified responsive to the analysis detecting a substantially constant upper boundary trend concurrent with a rising lower boundary trend.

20 Claims, 5 Drawing Sheets

(56) References Cited

U.S. PATENT DOCUMENTS

| | | | |
|---|---|---|---|
| 2010/0008226 A1* | 1/2010 | Kang | H04W 4/00 370/235 |
| 2013/0282891 A1 | 10/2013 | Davis et al. | |
| 2013/0304909 A1 | 11/2013 | Pappu | |
| 2014/0024399 A1* | 1/2014 | Shimo | H04W 64/006 455/457 |
| 2015/0262477 A1* | 9/2015 | Fowe | G08G 1/0133 701/118 |

OTHER PUBLICATIONS

Figueiredo et al., On TCP and self-similar traffic, Performance Evaluation, vol. 61, No. 2, pp. 129-141, Elsevier Science, Jan. 2005.
Goyal et al., Predicting TCP Throughput from Non-invasive Network Sampling, University of Pennsylvania Scholarly Commons, Jun. 23, 2002.
Kumpulainen, Pekka. Anomaly Detection for Communication Network Monitoring Applications, Tampere University of Technology, Publication 1192, Mar. 2014.

* cited by examiner

SYSTEMS AND METHODS FOR DETECTING CONSISTENT FABRIC CONGESTION IN A DATACENTER BASED ON HISTORICAL TRAFFIC DATA

BACKGROUND

Computing systems exchange information via one or more connected data networks by transmitting and receiving data packets according to one or more communication protocols. The data packets are moved through the networks by various intermediary network devices, which each receive packets, identify a next-hop for the received packets, and transmit the packets to the respectively identified next-hop. In some instances, a network device receives more packet data than it can handle, resulting in congestion wherein data transmission through the network device is negatively impacted. For example, some packets may be lost or "dropped." Network protocols may react to packet loss by resending lost packets and/or adjusting the rate of subsequent packet transmissions, resulting in inefficient use of the network.

If a network device experiences chronic congestion, it may be appropriate to take administrative steps to address the problem. For example, a network administrator might upgrade the network device or modify a network configuration to reduce the load on the device. However, in order to make a decision about how to address network congestion, a network administrator must first identify where congestion is occurring within a network.

SUMMARY

In one aspect, a system is presented comprising a data logging device and a congestion analyzer. The data logging device is configured to collect, into computer-readable memory, for each of a plurality of time intervals, a set of measurements of a quantifiable characteristic of traffic transiting a network device at a plurality of respective measurement times during each of the respective time intervals. The congestion analyzer, which includes at least one computer processor, is configured to select two or more sets of measurements, each set corresponding to a respective time interval in the plurality of time intervals, and determine, for each of the selected sets of measurements, a respective upper boundary and a respective lower boundary for the quantifiable characteristic during the respective time interval. The congestion analyzer is configured to then identify, for a time window inclusive of the time intervals corresponding to the selected sets of measurements, an upper boundary trend based on the determined upper boundaries and a lower boundary trend based on the determined lower boundaries, and analyze the upper boundary trend and the lower boundary trend. Responsive to the analysis detecting a substantially constant upper boundary trend concurrent with a rising lower boundary trend, the congestion analyzer is configured to output an indication that the network device experienced congestion during the time window. In some implementations, the congestion analyzer is configured to verify the selected sets of measurements and exclude false-positives.

In one aspect, a method is presented that includes collecting, for each of a plurality of time intervals, a set of measurements of a quantifiable characteristic of traffic transiting a network device at a plurality of respective measurement times during each of the respective time intervals. The method includes selecting two or more sets of measurements, each set corresponding to a respective time interval in the plurality of time intervals, and determining, for each of the selected sets of measurements, a respective upper boundary and a respective lower boundary for the quantifiable characteristic during the respective time interval. The method includes identifying, for a time window inclusive of the time intervals corresponding to the selected sets of measurements, an upper boundary trend based on the determined upper boundaries and a lower boundary trend based on the determined lower boundaries, and analyzing the upper boundary trend and the lower boundary trend. The method includes outputting, responsive to the analysis detecting a substantially constant upper boundary trend concurrent with a rising lower boundary trend, an indication that the network device experienced congestion during the time window.

In one aspect, computer-readable media stores instructions that, when executed by a computing processor, cause the computing processor to: collect, for each of a plurality of time intervals, a set of measurements of a quantifiable characteristic of traffic transiting a network device at a plurality of respective measurement times during each of the respective time intervals; to select two or more sets of measurements, each set corresponding to a respective time interval in the plurality of time intervals; to determine, for each of the selected sets of measurements, a respective upper boundary and a respective lower boundary for the quantifiable characteristic during the respective time interval; to identify, for a time window inclusive of the time intervals corresponding to the selected sets of measurements, an upper boundary trend based on the determined upper boundaries and a lower boundary trend based on the determined lower boundaries, and analyzing the upper boundary trend and the lower boundary trend; and to output, responsive to the analysis detecting a substantially constant upper boundary trend concurrent with a rising lower boundary trend, an indication that the network device experienced congestion during the time window.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Presented are systems and methods related to detection of network congestion. The systems and methods generally include a congestion monitor for collecting measurements of network traffic characteristics at a network device in a network. The measurements are collected over a length of time, which is divided into multiple time intervals. As described herein, in some implementations, a congestion analyzer determines whether the network device is likely to have experienced chronic congestion during some of the time intervals based on the collected measurements. In some implementations, the congestion analyzer determines whether the network device is likely to subsequently experience chronic congestion based on the collected measurements.

Figure 1:
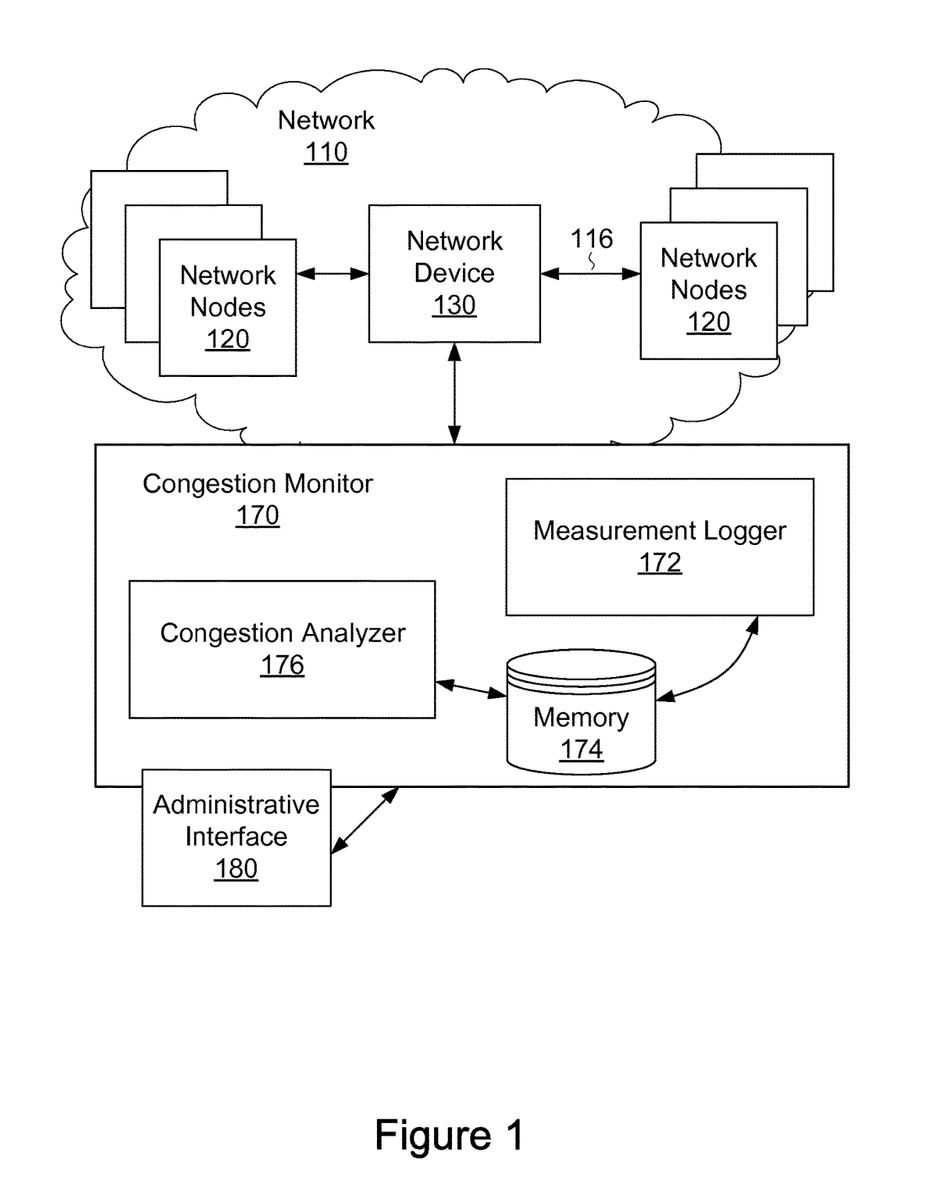
FIG. 1 is a block diagram of a network environment with a congestion monitor.

FIG. 1 is a block diagram of an example network environment 100 with a congestion monitor 170. In broad overview, the illustrated network environment includes a network 110 of interconnected network nodes 120. The network nodes 120 participate in the network 110 as data sources, data destinations (or data sinks), and intermediary nodes propagating data from sources towards destinations through the network 110. The network 110 includes an intermediary network device 130 with links 116 to various other participating network nodes 120. A congestion monitor 170 collects measurements of traffic transiting the network device 130. The congestion monitor 170 is shown as an independent device, but may be included as part of the network device 130. The congestion monitor 170 includes a measurement logger 172, which records measurements to memory 174, and a congestion analyzer 176. The congestion monitor 170 outputs congestion indicators to an administrative interface 180, which may be incorporated into the congestion monitor 170 or may be a separate device in communication with the congestion monitor 170, e.g., through the network 110 or through another connection not shown.

Referring to FIG. 1 in more detail, the network 110 is a network facilitating interactions between participant devices. An illustrative example network 110 is the Internet; however, in other implementations, the network 110 may be another network, such as a local network within a data center, a network fabric, or any other local area or wide area network. The network 110 may be composed of multiple connected sub-networks or autonomous networks. The network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. Any type and/or form of data network and/or communication network can be used for the network 110. It can be public, private, or a combination of public and private networks. In general, the network 110 is used to convey information between computing devices, e.g., network nodes 120, and the network device 130 facilitates this communication according to its configuration.

Figure 5:
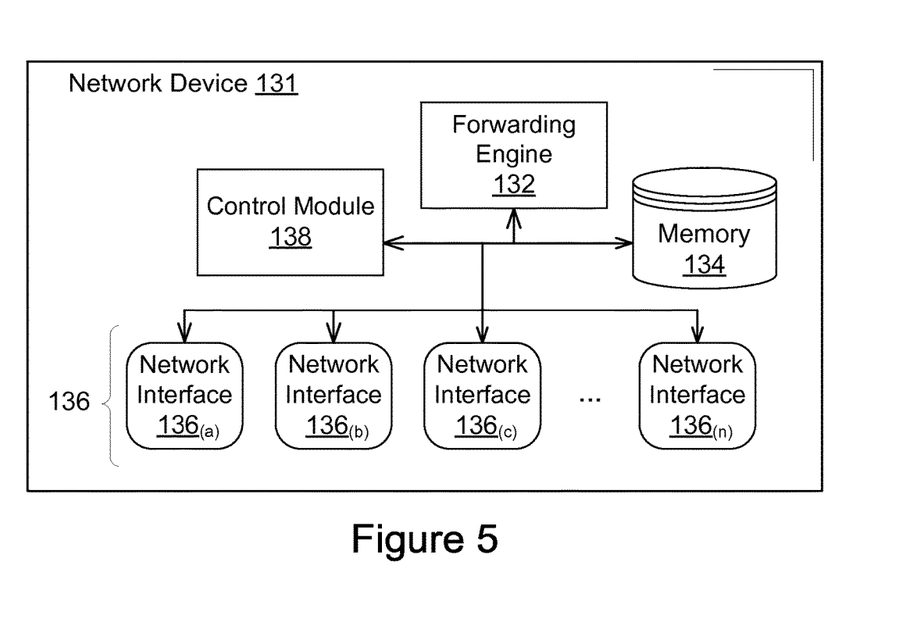
FIG. 5 is a block diagram of an example network device.

The network device 130 is a device tailored to receive and forward packets in a network, for example, a switch or router. It can also be a segment of network media ("fiber"). FIG. 5, described in more detail below, is a box diagram of a network device 131 suitable for use as the network device 130. Referring briefly to FIG. 5, the network device 131 includes network interfaces 136 for linking to other network nodes; a forwarding engine 132 that identifies, for each received packet, which of the network interfaces 136 to use for egress transmission of the packet; and memory 134 for storing routing information, one or more packet buffers, and any other configuration information used by the network device 131. The network device 131 shown in FIG. 5 also includes a control module 138 responsible for managing the information stored in the memory 134, e.g., the routing information and/or the configuration information. The network device 131 is described in more detail below, in reference to FIG. 5. The elements shown in the network device 131 illustrated in FIG. 5 do not all need to be present in some implementations of the network device 130 illustrated in FIG. 1. For example, the network device 130 of FIG. 1 may simply buffer and forward packets along a fixed route, without any route-decision components. Other network device implementations may be suitable for use as the network device 130.

Referring to FIG. 1, when the network device 130 receives a packet, it writes the packet data into a buffer for processing. For example, the network device 130 may identify a next-hop to which the packet should be forwarded. The buffer may be stored, for example, in the memory 134 shown in FIG. 5. The network device 130 then transmits the received packet from the buffer onto a link 116 to the identified next-hop. While the network device 130 is processing the packet, and while it transmits the packet to the next-hop, the packet occupies space in the buffer. While processing the packet, the network device 130 may receive additional packets, which then also occupy space in the buffer. If the amount of data received by the network device 130 exceeds the capacity of the buffer, some data will be lost. For example, the network device 130 may "drop" the most recently received packet, or the network device 130 may overwrite data already in the buffer, such as when the buffer is configured as a ring buffer.

There is a limit to how much data traffic the network device 130 can handle. An example metric for load on the network device 130 is the ratio of the amount of data held in its buffer at one time to the maximum amount of data that can be concurrently held in the buffer. The maximum amount of data that can be concurrently held by the network device can be stated as a multiple of the largest packet size that can be handled (i.e., received or sent) by the network device 130; the largest packet size is referred to as the maximum transmission unit ("MTU"). The network device 130 receives data at a rate less than or equal to a maximum inflow transmission rate, and the network device 130 places the received data into the buffer. Accordingly, another way of stating the capacity of the network device 130 is the length of time, at the maximum inflow transmission rate of MTUs, that it takes to fill the buffer.

The network device 130 is considered to be under a heavier load when the buffer is consistently at or near maximum capacity. If the heavy load consistently results in dropped packets, with a deteriorative effect on the quality of service through the network 110, then the network device 130 is considered to be congested. Congestion manifests itself by increases in latency at higher throughput demands, which leads to more packets in the buffer simultaneously, and may ultimately lead to loss of communication on a network interface, excessive packet loss, violations of service-level obligations, and over-all service degradation. Under normal conditions, the network device 130 may periodically enter a brief congested state while handling short bursts of traffic. However, if the network device 130 is consistently in a congested state, or routinely enters a congested state with some frequency, then it may be chronically congested.

The network device 130 has quantifiable characteristics that can be used to identify and/or predict congestion. One example of a quantifiable characteristic is throughput, which is the amount of data transmitted during a fixed unit of time, e.g., number of bits per second. Throughput can be measured as bits (at a specific order of magnitude, e.g., kilobits or gigabits) per second, packets per second, MTUs per second, and so forth. The fixed unit of time is usually seconds, but can be any fixed length of time, e.g., milliseconds, minutes, days, etc. Throughput can be measured for a specific link 116 to or from the network device 130, or for the network device 130 as a whole. Throughput measurements are generally agnostic to other performance-related measures such as latency, explicit congestion indicators, or lost packets in specific flows. Another quantifiable characteristic is data arrival rate, which is a measure of demand on the network device 130. Another quantifiable characteristic is goodput, which is the amount of "useful" data transmitted during a fixed unit of time. Generally, protocol overhead and re-transmitted redundant packets are not considered "useful" in the context of measured goodput. In some implementations, the quantifiable characteristic is first-attempt throughput, which excludes packets that are re-transmissions, similar to goodput, but still measures protocol overhead.

The congestion monitor 170 includes a measurement logger 172 that records or logs measurements of quantifiable characteristics for the network device 130 (or for a link 116 to/from the network device 130). The measurements can include measurements across a variety of data flows. In some implementations, measurements are for a sliding window of time, e.g., for the last two weeks or for the last five days. In some implementations, the measurement logger 172 is configured to collect a number of measurements over the course of a time interval, e.g., over an hour or over a day, for an extended number of time intervals, e.g., for weeks or months. The measurement logger 172 may collect the measurements periodically, e.g., every few milliseconds or every few seconds. In some implementations, the measurement logger 172 collects the measurements according to a pre-set schedule. The measurements may be pushed from the network device 130 to the measurement logger 172, or pulled from the network device 130 by the measurement logger 172.

The measurement logger 172 records or logs the measurements into memory 174, which may be any device suitable for storing computer readable data. The memory 174 may be similar to the memory 144 or cache 149 illustrated in FIG. 6 and described below. Examples include, but are not limited to, semiconductor memory devices such as EPROM, EEPROM, SDRAM, and flash memory devices. A measurement logger 172 may have any number of memory devices 174. In some implementations, the measurement logger 172 records the measurements in a database stored by the memory 174. In some implementations, the measurement logger 172 records the measurements in one or more log files stored by the memory 174. Each log file may be a set of measurements over a length of time. For example, the file may represent a day of measurements, which are written to the file by the measurement logger 172 over the course of the day. In some implementations, the measurement logger 172 records the measurements in an array stored in volatile memory. In some such implementations, the array is a ring buffer. In some implementations, the measurement logger 172 retains measurements in memory 174 for a predetermined length of time. In some implementations, the measurement logger 172 retains measurements in memory 174 until the memory 174 is at full capacity, at which point the oldest measurements are discarded.

The congestion monitor 170 includes a congestion analyzer 176 that accesses the memory 174, and analyzes the recorded measurements to identify likely occurrences of congestion. In some implementations, the congestion analyzer 176 is implemented as a special purpose circuit such as an application-specific integrated circuit ("ASIC"). In some implementations, the congestion analyzer 176 is implemented as a set of computer executable instructions stored in computer accessible memory for execution by one or more computing processors. In some such implementations, the congestion analyzer 176 is a computing system 141, illustrated in FIG. 6 and described below, and the computer executable instructions are stored in either the memory 144 or in the cache 149, with the processor(s) 148 configured to execute the instructions as described.

Referring still to FIG. 1, the congestion monitor 170 generates analysis output to an administrative interface 180. The administrative interface 180 provides output to an administrator, and, in some implementations, provides a configuration interface through which an administrator can control the operational parameters of the congestion monitor 170. In some implementations, the administrative interface 180 is integrated into the congestion monitor 170. In some implementations, the congestion monitor 170 communicates with a separate administrative interface 180, e.g., through a data network, through a dedicated link, through a wireless link, or through any other communication medium. In some implementations, the administrative interface 180 is an application program interface ("API"). In some implementations, the administrative interface 180 is implemented as a special purpose circuit such as an ASIC. In some implementations, administrative interface 180 is implemented as a set of computer executable instructions stored in computer accessible memory for execution by one or more computing processors. In some such implementations, the administrative interface 180 is a computing system 141, illustrated in FIG. 6 and described below. In some implementations, the administrative interface 180 generates alerts or messages, which it then transmits to an administrator via electronic mail, text message, automated telephone call, or other similar communication means.

The congestion analyzer 176 reads the measurements stored in memory 174 and identifies likely occurrences of congestion. In some implementations, this analysis is retrospective. That is, the congestion analyzer 176 identifies blocks of time intervals, e.g., sequences of days, where the measurements exhibit chronic congestion. In some implementations, the analysis is prospective. That is, the congestion analyzer 176 extrapolates trend information into the future to predict congestion. As described in more detail below, the congestion analyzer selects two or more sets of measurements, each set corresponding to a respective time interval, and determines, for each of the selected sets of measurements, a respective upper boundary and a respective lower boundary for the quantifiable characteristic during the respective time interval. The congestion analyzer then identifies, for a time window inclusive of the time intervals corresponding to the selected sets of measurements, an upper boundary trend based on the determined upper boundaries and a lower boundary trend based on the determined lower boundaries, and analyzes the upper boundary trend and the lower boundary trend. The congestion monitor 170 then generates output, e.g., to the administrative interface 180, indicating whether the analysis suggests that the network device 130 experienced congestion during the time window.

Figure 6:
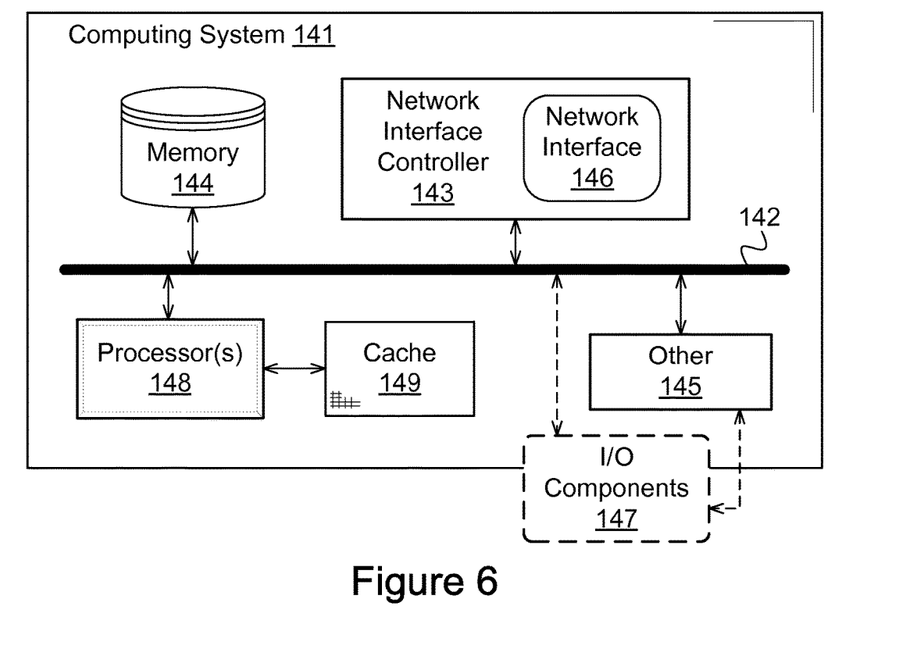
FIG. 6 is a block diagram of an example computing system.

FIG. 5, described below, illustrates an example implementation of a network device 131 suitable for use as the network device 130. FIG. 6, described below, illustrates a computing system 141 suitable for use as one or more of: the network nodes 120, the network device 130, the congestion monitor 170, the measurement logger 172, the congestion analyzer 176, and/or the administrative interface 180.

Referring to FIG. 1, after the congestion logger 172 has collected measurements for a sufficiently long measurement period, the congestion analyzer 176 analyzes the collected measurements to identify throughput trends. In general, the analysis includes identifying upper and lower bounds for statistically-relevant measurements during different time intervals within the measurement period. During extended periods of high network utilization, the upper and lower boundaries will trend upwards over the course of consecutive time intervals. However, during periods of extreme congestion, the network will not have capacity for the upper boundary to continue this upward trend. As a result, while the upper boundary is somewhat stagnant, the lower boundary will continue to trend upwards. This combination may indicate a period of congestion.

Figure 2:
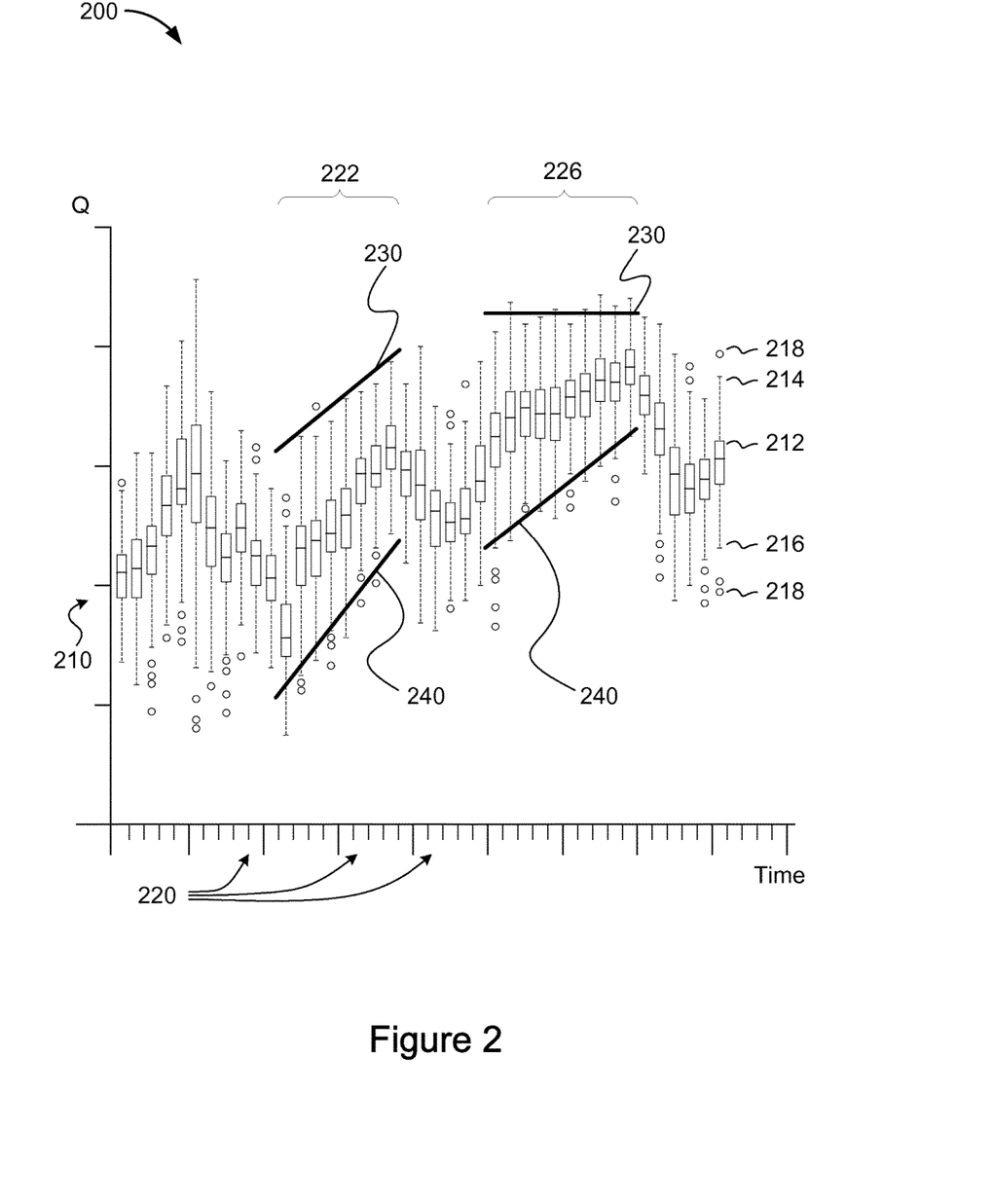
FIG. 2 is a boxplot diagram representing hypothetical measurements of a quantifiable characteristic of traffic transiting a network device over time intervals.

The upper and lower bounds are identified using nonparametric methods such as Tukey's inter-quartile range ("IQR") analysis. The IQR is the difference between the upper and lower quartile measurements (25th and 75th percentiles, respectively). The upper bound is the upper-quartile measurement plus an offset, and the lower bound is the lower-quartile measurement minus an offset. In some implementations, the offsets are the same; while in other implementations, the offsets differ. In some implementations, the offsets are based on the IQR. An example offset is the IQR multiplied by a constant. Tukey's IQR analysis used an offset of the IQR multiplied by a constant of 1.5, and referred to these boundaries as "fences"; however, any constant can be used. In a Box-Plot visualization of IQR, the upper and lower quartile measurements frame a box with a mark indicating the median and with lines ("whiskers") extending from the box to the upper and lower boundaries. FIG. 2, described in more detail below, is an example of Box-Plot visualization. The box and the whiskers form a graph of the relevant measurements, and any measurement outside the inter-whisker range ("IWR") are outside the boundary fences and considered outliers. Changing the multiplier (e.g., from Tukey's 1.5) used in calculating the boundary offsets will change the threshold for relevance.

FIG. 2 is a boxplot diagram 200 representing hypothetical measurements 210 of a quantifiable characteristic of traffic transiting a network device over time intervals 220. The boxplot diagram 200 groups measurements recorded at times within a time interval as a column representing the time interval. The box portion 212 of the column represents the IQR for the column, with whiskers extending above 214 and below 216 to respective upper and lower boundary fences. Outliers are indicated by circles 218 above or below ("outside") the whisker edges. The diagram 200 includes upper boundary trend lines 230 and lower boundary trend lines 240 for two time windows 222 and 226, where the time windows 222 and 226 each include multiple time intervals 220. Time window 222 represents a portion of time in which congestion has not occurred, and time window 226 represents a portion of time in which congestion may have occurred. The data represented by the diagram 200 is hypothetical. The following descriptions of FIG. 3 and FIG. 4 reference the boxplot diagram 200 of FIG. 2 solely as a visual example, and such references are not meant to be limiting in any way.

After the congestion monitor has collected a plurality of periodic measurements of traffic transiting a network device for distinct time intervals, e.g., as represented in the boxplot diagram 200, a data analyzer identifies or calculates the upper and lower boundaries, and the IWR, for each time interval. The analyzer evaluates a series of time intervals, and determines from the evaluation whether these values indicate congestion. If a network device experiences chronic congestion, the network device and/or its surrounding network can then be prioritized for additional infrastructure to ameliorate the condition.

Figure 3:
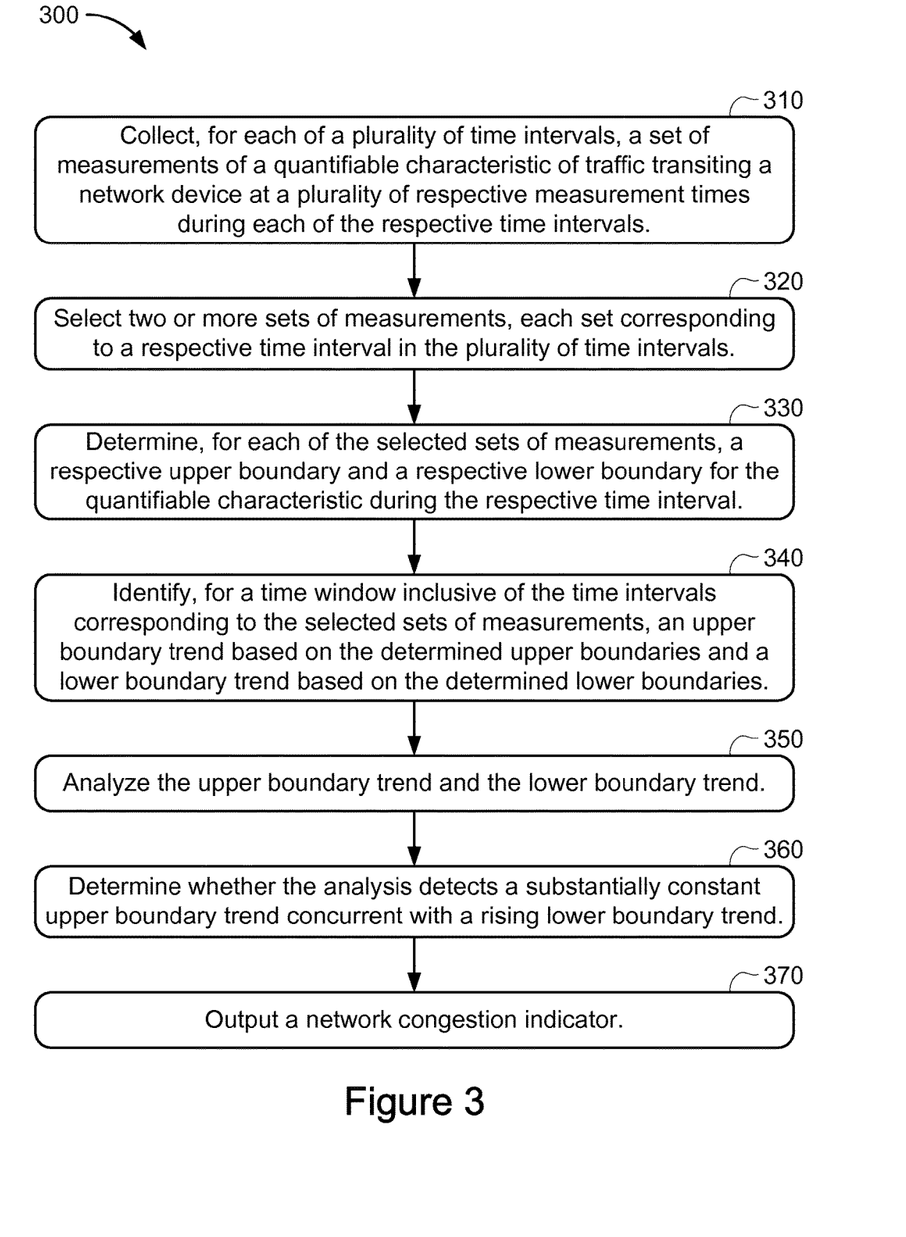
FIG. 3 is a flowchart for analyzing network traffic using an example method.

FIG. 3 is a flowchart for analyzing network traffic using an example method 300. In broad overview, the method 300 begins with stage 310, where a congestion monitor collects, for each of a plurality of time intervals, a set of measurements of a quantifiable characteristic of traffic transiting a network device at a plurality of respective measurement times during each of the respective time intervals. At stage 320, the congestion monitor selects two or more sets of measurements, each set corresponding to a respective time interval in the plurality of time intervals. At stage 330, the congestion monitor determines, for each of the selected sets of measurements, a respective upper boundary and a respective lower boundary for the quantifiable characteristic during the respective time interval. At stage 340, the congestion monitor identifies, for a time window inclusive of the time intervals corresponding to the selected sets of measurements, an upper boundary trend based on the determined upper boundaries and a lower boundary trend based on the determined lower boundaries. Then, at stage 350, the congestion monitor analyzes the upper boundary trend and the lower boundary trend, and at stage 360, determines whether the analysis detects a substantially constant upper boundary trend concurrent with a rising lower boundary trend. If there analysis determines that the trends indicate congestion, then at stage 370 the congestion monitor outputs a network congestion indicator.

Referring to FIG. 3, in more detail, at stage 310 of the method 300, a congestion monitor collects, for each of a plurality of time intervals, a set of measurements of a quantifiable characteristic of traffic transiting a network device at a plurality of respective measurement times during each of the respective time intervals. For example, referring to FIG. 1, the measurement logger 172 in the congestion monitor 170 periodically obtains measurements from a network device 130 and records the measurements in memory 174. In some implementations, the measurement logger 172 obtains the measurements by requesting status information from the network device 130 and receiving a response from the network device 130 with data sufficient to determine the quantifiable characteristic to be measured. In some implementations, the network device 130 provides this status data to the measurement logger 172 at periodic intervals, without requiring a specific status request. In some implementations, the measurement logger 172 is integrated into the network device 130 and measures the quantifiable characteristic directly.

Referring to FIG. 3, at stage 320, the congestion monitor selects two or more sets of measurements, each set corresponding to a respective time interval in the plurality of time intervals. For example, an aggregate set of measurements may correspond to all measurements of throughput at the network device during a particular time interval (e.g., during a particular day). The congestion monitor selects aggregate sets of measurements to analyze where there is potential for the selected measurements to indicate congestion. Time intervals for which the measurements indicate an uncongested state are excluded from the selection. For example, in some implementations, the congestion monitor excludes time intervals during which the maximum characteristic measurements are below a threshold indicative of normal operation. That is, if the maximum measurements of the quantifiable characteristic are below the threshold indicating no congestion, then the interval may be excluded. In some implementations, the congestion monitor identifies clusters of intervals during which the maximum measurements trend downwards, and excludes these identified clusters.

At stage 330, the congestion monitor determines, for each of the selected sets of measurements, a respective upper boundary and a respective lower boundary for the quantifiable characteristic during the respective time interval. In some implementations, the IQR for the set of measurements is identified and the upper and lower Tukey Fences are calculated based on the IQR. In some implementations, the highest measurement equal to or less than the upper Tukey Fence is used as the upper boundary for the set of measurements, and the lowest measurement equal to or greater than the lower Tukey Fence is used as the lower boundary for the set of measurements. In some implementations, the upper Tukey Fence itself is used as the upper boundary for the set of measurements, and the lower Tukey Fence itself is used as the lower boundary for the set of measurements, regardless of whether a measurement is actually equal to the fence value. In some implementations, an administrator can configure the constant used in calculating the fence values in order to tune the sensitivity of the analysis.

Referring back to the boxplot diagram 200 shown in FIG. 2, each column represents a time interval 220, and the whiskers extending above 214 and below 216 the boxes 212 in each column represent the IWR for the hypothetical measurements represented. The ends of the whisker lines correspond to the upper and lower boundaries that are determined, in some implementations, by the congestion monitor at stage 330 shown in FIG. 3.

Referring to FIG. 3, at stage 340, the congestion monitor identifies, for a time window inclusive of the time intervals corresponding to the selected sets of measurements, an upper boundary trend based on the determined upper boundaries and a lower boundary trend based on the determined lower boundaries. In some implementations, the upper and lower boundaries are fit to respective linear models. For example, in FIG. 2, upper boundary lines 230 approximate upper boundary trends across multiple time intervals 220. If the slope of the linear model for the upper boundaries is increasing or decreasing by more than a threshold value, this may indicate a non-congested state. See, for example, the upper boundary line 230 for time interval 222 in FIG. 2. If the slope for the upper boundaries is within the threshold range, i.e., if the slope is sufficiently flat to indicate that the upper boundaries are substantially constant, then the data may indicate congestion. See, for example, the upper boundary line 230 for time interval 226 in FIG. 2.

Referring to FIG. 3, at stage 350, the congestion monitor analyzes the upper boundary trend and the lower boundary trend. A congestion analyzer (e.g., the congestion analyzer 176 shown in FIG. 1) determines whether the upper boundary trend and lower boundary trend for the same time window may indicate congestion. In some implementations, the time window is selected based on the one boundary trend having the potential to indicate congestion, such that only the other boundary trend requires further analysis. For example, in some implementations, the time window is selected based on the upper boundary trend having the potential to indicate congestion, such that only the lower boundary trend requires further analysis at stage 350. In some such implementations, the lower boundaries are then fit to a linear model. For example, in FIG. 2, lower boundary lines 240 approximate lower boundary trends across multiple time intervals 220. If the slope of the linear model is higher than a threshold value, this indicates that the lower boundaries are increasing in a manner indicative of congestion. In other implementations, the congestion analyzer 176 first examines the lower boundary trend for a time window, and only evaluates the upper boundary trend for the time window if it has identified a lower boundary trending indicating an increasing lower boundary. In some other implementations, the congestion analyzer 176 evaluates the upper boundary and lower boundary trends of each and every time window.

Referring to FIG. 3, at stage 360, the congestion monitor determines whether the analysis detects a substantially constant upper boundary trend concurrent with a rising lower boundary trend. The upper boundary values correspond to a high-water value for the quantifiable characteristic of the network device, and the lower boundary values correspond to low-water values for the quantifiable characteristic of the network device. If the upper boundary trend indicates that the high-water value is maxed out, this suggests the network device cannot handle more traffic. If the low-water values are rising at the same time, indicated by an increasing lower boundary trend, this indicates that increasing levels of traffic demand are present, despite the network device being unable to handle it. That is, the combination of a substantially flat upper boundary trend concurrent with a rising lower boundary trend indicates that the network device may be congested. In some implementations, additional analysis is used to verify the conclusion of congestion by identifying false positives. For example, if there are outlier values above the upper boundaries or upper boundary trend lines, e.g., as represented by circles 218 in FIG. 2, this may indicate that the network device could actually handle more traffic and is thus not congested.

If the analysis determines that the trends indicate congestion, then at stage 370 the congestion monitor outputs a network congestion indicator. Referring to FIG. 1, the congestion monitor 170 outputs the network congestion indicator to an administrative interface 180. In some implementations, the output is in the form of an electronic message (e.g., email, text message, pre-recorded telephone call, etc.). In some implementations, the administrative interface 180 is a website that provides information to an administrator indicating the status of the network device 130. In some implementations, the administrative interface 180 aggregates status information from a multitude of network devices.

Figure 4:
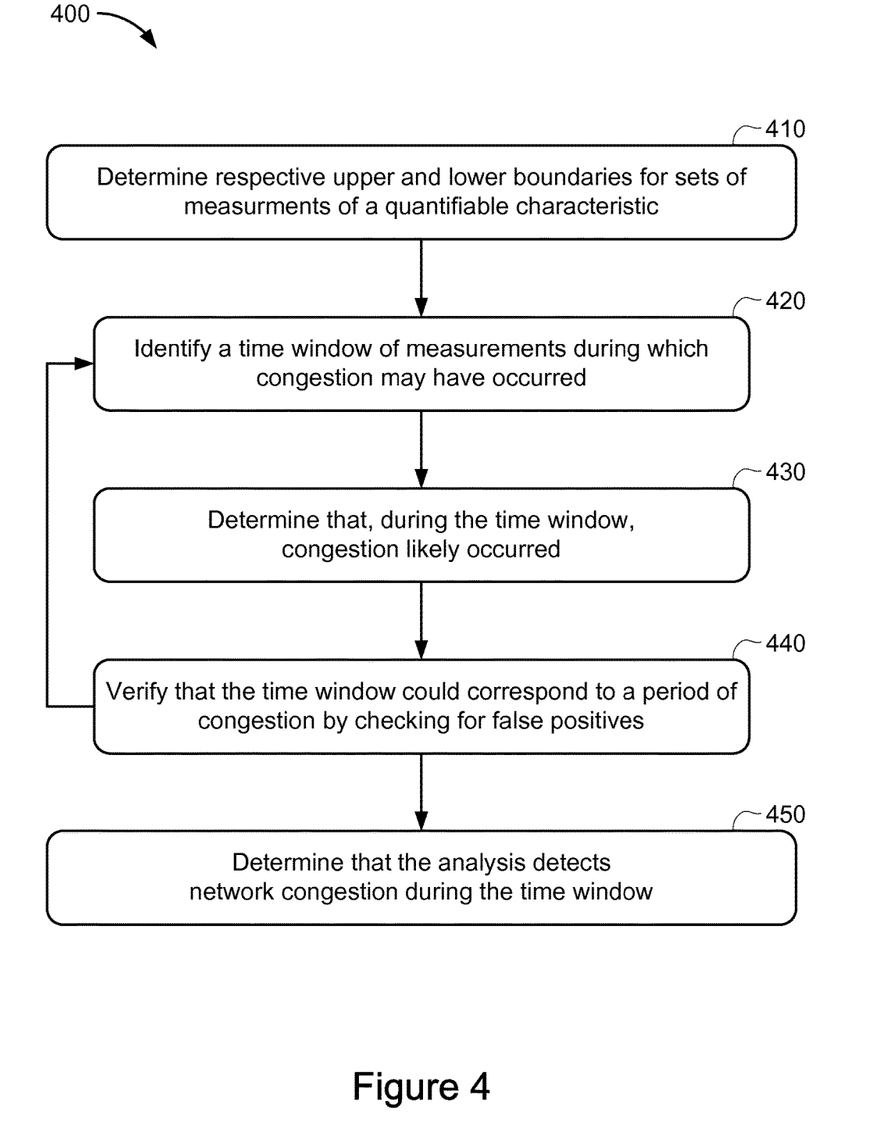
FIG. 4 is a flowchart for identifying a congestion window using an example method.

FIG. 4 is a flowchart for identifying a congestion window using an example method 400. In broad overview, the method 400 begins with stage 410 in which a congestion analyzer determines respective upper and lower boundaries for sets of measurements of a quantifiable characteristic, e.g., throughput. At stage 420 the congestion analyzer identifies a time window of measurements during which congestion may have occurred. At stage 430 the congestion analyzer determines that, during the identified time window, congestion is likely to have occurred. At stage 440 the congestion analyzer verifies that the identified time window could correspond to a period of congestion by checking for false positives. Then, at stage 450, the congestion analyzer determines that the analysis detects network congestion during the time window.

Referring to FIG. 4 in more detail, the method 400 begins with stage 410, in which a congestion analyzer (e.g., the congestion analyzer 176 shown in FIG. 1) determines respective upper and lower boundaries for sets of measurements of a quantifiable characteristic, e.g., throughput. The boundary determination in stage 410 is similar to that described in reference to stage 330 of FIG. 3.

At stage 420 the congestion analyzer 176 identifies a time window of measurements during which congestion may have occurred. For example, in some implementations, the congestion analyzer 176 identifies a time window for which the upper boundary measurements of the constituent time intervals have a trend that is substantially constant. In some implementations, the congestion analyzer 176 looks for at least a predetermined number of contiguous time intervals (e.g., three or more time intervals) in which the maximum measurements for the quantifiable characteristic of the network device are relatively static. In some such implementations, the upper boundary values for all measured time intervals are processed to find clusters of time intervals with similar upper boundaries, and a cluster with at least the predetermined number of contiguous time intervals is identified as a time window for which congestion may have occurred. In some implementations, the predetermined number is configured via an administrative interface 180. In some implementations, the predetermined number defaults to three. In some implementations, the congestion analyzer 176 calculates or computes a total delta (gain or loss) predicted by a linear model of the upper boundary values. The congestion analyzer then divides the total delta value by the mean value of the upper boundaries for the cluster to reach a delta-to-mean ratio. If the delta-to-mean ratio is less than a threshold (e.g., less than 0.1), then the upper boundaries are substantially constant. Referring back to FIG. 2, the measurements in time interval 226 have upper boundary values that are sufficiently static to be identified, in stage 420, as substantially constant.

Referring to FIG. 4, at stage 430 the congestion analyzer 176 determines that, during the identified time window, congestion is likely to have occurred. For example, in some implementations, having identified a time window in which the upper boundaries are substantially constant, the congestion analyzer 176 then determines whether the lower boundary trend is rising. In some implementations, the congestion analyzer determines whether there is a statistical correlation between the lower boundary values and their respective position within the identified time window. If there is a correlation, meaning that the position along the time sequence matters, then the lower boundary has statistical meaning. In some implementations, the congestion analyzer fits the lower boundary values for the time intervals in the identified time window to a linear model, and determines whether the slope of the linear model is increasing.

Based on the analysis in stage 420 and stage 430 identifying a time window during which it is possible for congestion to have occurred and then determining that it is likely congestion occurred, the congestion analyzer 176 may conclude that congestion occurred during the identified time window. Although the descriptions of stage 420 and 430 provide examples in which the congestion analyzer 176 first identifies the time window based on the upper boundaries, in some implementations, the ordering is reversed. That is, in some implementations, the congestion analyzer 176 first identifies the time window based on statistically relevant and increasing lower boundaries, and then verifies that the corresponding upper boundaries are substantially constant. Once the congestion analyzer 176 has determined that the network device 130 may have experienced congestion during a particular time window, it can check for counter-indicative data clearly demonstrating that the network device 130 did not experience congestion during the time window. That is, in some implementations, the congestion analyzer 176 looks for indications of a false positive.

At stage 440 the congestion analyzer verifies that the time window could correspond to a period of congestion by checking for false positives. In some implementations, the congestion analyzer merges measurement data for time-adjacent time intervals and computes new upper and lower boundary values for the merged time interval. If there are outlier measurements in the merged time interval that are higher than the new upper boundary value, this may indicate unused capacity. That is, it may indicate a false positive for congestion. In some implementations, if the congestion analyzer detects a false positive at stage 440, the method 400 rejects the time interval and returns to stage 420. However, if no false positives are detected, then the network device may have been congested during the identified window of time. Accordingly, at stage 450, the congestion analyzer determines that the analysis detects network congestion during the time window.

FIG. 5 is a block diagram of an example network device 131. The example network device 131 is suitable for use in implementing the intermediary network devices described herein, in accordance with an illustrative implementation. The computing system 141, described below in reference to FIG. 6, may also be suitable as a network device 131. In broad overview, the network device 131 includes a control module 138 and memory 134, e.g., for storing device configuration and routing data. The network device 131 includes a forwarding engine 132 that uses the device configuration and routing data stored in memory 134 to manage data traffic at network interfaces 136.

Referring to FIG. 5, in more detail, the device 131 includes a set of network interfaces 136. Each network interface 136 may be connected by one or more links to one or more external devices, forming a network (e.g., the network 110 shown in FIG. 1). External devices send data packets to the network device 131, via these links, arriving via an ingress interface (e.g., network interface $136_a$). The network device 131 forwards received data packets to an appropriate next-hop via an egress interface (e.g., network interface $136_c$). In some implementations, the forwarding engine 132 determines which network interface 136 to use for forwarding each data packet received.

The forwarding engine 132 uses configuration and routing data in memory 134 to manage the data traffic at network interface ports 136. The configuration and routing data in memory 134 are controlled by the control module 138. In some implementations, the forwarding engine 132 updates packet headers before forwarding packets to an egress network interface port 136. For example, the forwarding engine 136 may update ECN, TTL, or checksum information in packet headers.

The memory 134 may be any device suitable for storing computer readable data. Examples include, but are not limited to, semiconductor memory devices such as EPROM, EEPROM, SRAM, and flash memory devices. In some implementations, the memory 134 of a network device 131 includes memory dedicated to storing patterns for identifying packet flows, e.g., as ternary content-addressable memory ("TCAM"). In some implementations, the memory 134 of a network device 131 includes memory dedicated to buffering packet flows as they traverse the network device 131. A network device 131 may have any number of memory devices 134.

The control module 138 manages the performance of the network device 131. In some implementations, the control module 138 receives instructions from an external control device, e.g., as in a software-defined network ("SDN") device. In some implementations, the control module 138 processes route-information packets (i.e., control plane packets) and updates the memory 134 with modifications to routing tables used by the forwarding engine 132. In some implementations, the control module 138 reads data arriving at an egress interface 136 into a buffer stored in memory 134. The control module 138 may be implemented using a general purpose processor or special purpose logic circuitry, e.g., an application specific integrated circuit ("ASIC").

FIG. 6 is a block diagram of an example computing system 141. The example computing system 141 is suitable for use in implementing the computerized components described herein, in accordance with an illustrative implementation. In broad overview, the computing system 141 includes at least one processor 148 for performing actions in accordance with instructions and one or more memory devices 144 or 149 for storing instructions and data. The illustrated example computing system 141 includes one or more processors 148 in communication, via a bus 142, with memory 144, at least one network interface controller 143 with network interface port 146 for connection to a network (not shown), and other components 145, e.g., input/output ("I/O") components 147. Generally, the processor(s) 148 will execute instructions received from memory. The processor(s) 148 illustrated incorporate, or are directly connected to, cache memory 149. In some instances, instructions are read from memory 144 into cache memory 149 and executed by the processor(s) 148 from cache memory 149.

In more detail, the processor(s) 148 may be any logic circuitry that processes instructions, e.g., instructions fetched from the memory 144 or cache 149. In many embodiments, the processor(s) 148 are microprocessor units or special purpose processors. The computing device 141 may be based on any processor, or set of processors, capable of operating as described herein. The processor(s) 148 may be single core or multi-core processor(s). The processor(s) 148 may be multiple distinct processors.

The memory 144 may be any device suitable for storing computer readable data. The memory 144 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 141 may have any number of memory devices 144.

The cache memory 149 is generally a form of computer memory placed in close proximity to the processor(s) 148 for fast read times. In some implementations, the cache memory 149 is part of, or on the same chip as, the processor(s) 148. In some implementations, there are multiple levels of cache 149, e.g., L2 and L3 cache layers.

The network interface controller 143 manages data exchanges via the network interface 146 (sometimes referred to as network interface ports). The network interface controller 143 handles the physical and data link layers of the OSI model for network communication. In some implementations, some of the network interface controller's tasks are handled by one or more of the processor(s) 148. In some implementations, the network interface controller 143 is part of a processor 148. In some implementations, a computing system 141 has multiple network interfaces 146 controlled by a single controller 143. In some implementations, a computing system 141 has multiple network interface controllers 143. In some implementations, each network interface 146 is a connection point for a physical network link (e.g., a cat-5 Ethernet link). In some implementations, the network interface controller 143 supports wireless network connections and an interface port 146 is a wireless (e.g., radio) receiver/transmitter (e.g., for any of the IEEE 802.11 protocols, near field communication "NFC", Bluetooth, ANT, or any other wireless protocol). In some implementations, the network interface controller 143 implements one or more network protocols such as Ethernet. Generally, a computing device 141 exchanges data with other computing devices via physical or wireless links through a network interface 146. The network interface 146 may link directly to another device or to another device via an intermediary device, e.g., a network device such as a hub, a bridge, a switch, or a router, connecting the computing device 141 to a data network such as the Internet.

The computing system 141 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

The other components 145 may include an I/O interface, external serial device ports, and any additional co-processors. For example, a computing system 141 may include an interface (e.g., a universal serial bus (USB) interface) for connecting input devices, output devices, or additional memory devices (e.g., portable flash drive or external media drive). In some implementations, a computing device 141 includes an additional device 145 such as a co-processor, e.g., a math co-processor can assist the processor 148 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A system comprising:
    a data logging device comprising computer-readable memory configured to collect, for each of a plurality of time intervals, a set of measurements of a quantifiable characteristic of traffic transiting a network device at a plurality of respective measurement times during each of the respective time intervals; and
    a congestion analyzer comprising at least one computer processor configured to:
        select two or more sets of measurements, each set corresponding to a respective time interval in the plurality of time intervals;
        determine, for each of the selected sets of measurements, a respective upper boundary and a respective lower boundary for the quantifiable characteristic during the respective time interval;
        identify, for a time window inclusive of the time intervals corresponding to the selected sets of measurements, an upper boundary trend based on the determined upper boundaries and a lower boundary trend based on the determined lower boundaries;
        analyze the upper boundary trend and the lower boundary trend; and
        output, responsive to the analysis detecting a substantially constant upper boundary trend concurrent with a rising lower boundary trend, an indication that the network device experienced congestion during the time window.

2. The system of claim 1, wherein the quantifiable characteristic is total throughput at the network device.

3. The system of claim 1, wherein the network device is a first network device, and the congestion analyzer is configured to compare the upper boundary trend and the lower boundary trend for the first network device with an upper boundary trend and a lower boundary trend for a second network device, and to output a ranking indicating that the first network device experienced more congestion than the second network device during the time window based on the comparison.

4. The system of claim 1, wherein the congestion analyzer is configured to:
    identify, for a first set of measurements in the sets of measurements, an upper-quartile and a lower-quartile;
    determine a boundary offset based on the upper-quartile and the lower-quartile;
    determine the upper boundary based on the upper-quartile and the boundary offset; and
    determine the lower boundary based on the lower-quartile and the boundary offset.

5. The system of claim 4, wherein the congestion analyzer is configured to calculate the boundary offset as the upper-quartile less the lower-quartile, multiplied by a constant.

6. The system of claim 1, wherein the data logging device is configured to store each collected measurement, in association with an identifier for the respective measurement time, in a first-in first-out buffer.

7. The system of claim 1, wherein each of the plurality of time intervals corresponds to a respective day, and wherein the time window includes a fixed number of days.

8. The system of claim 1, wherein the congestion analyzer is configured to:
    form a merged set of measurements by combining a first set of measurements for a first time interval within the time window and a second set of measurements for a second time interval within the time window, the first time interval contiguous with the second time interval;
    determine, for the merged set of measurements, a combined upper boundary; and verify that the merged set of measurements does not include outlier measurements greater than the combined upper boundary.

9. The system of claim 1, wherein the congestion analyzer is configured to:
 form a merged set of measurements by combining a first set of measurements for a first time interval within the time window and a second set of measurements for a second time interval within the time window, the first time interval contiguous with the second time interval;
 determine, for the merged set of measurements, a combined upper boundary;
 identify an outlier measurement in the merged set of measurements that is greater than the combined upper boundary; and
 identify, responsive to identification of the outlier measurement, a false-positive for congestion during the time window.

10. The system of claim 1, wherein the congestion analyzer is configured to exclude, from the selected two or more sets of measurements, a first set of measurements corresponding to a first time interval, responsive to a determination that the network device was not experiencing congestion during the first time interval.

11. A method comprising:
 collecting, for each of a plurality of time intervals, a set of measurements of a quantifiable characteristic of traffic transiting a network device at a plurality of respective measurement times during each of the respective time intervals;
 selecting two or more sets of measurements, each set corresponding to a respective time interval in the plurality of time intervals;
 determining, for each of the selected sets of measurements, a respective upper boundary and a respective lower boundary for the quantifiable characteristic during the respective time interval;
 identifying, for a time window inclusive of the time intervals corresponding to the selected sets of measurements, an upper boundary trend based on the determined upper boundaries and a lower boundary trend based on the determined lower boundaries;
 analyzing the upper boundary trend and the lower boundary trend; and
 outputting, responsive to the analysis detecting a substantially constant upper boundary trend concurrent with a rising lower boundary trend, an indication that the network device experienced congestion during the time window.

12. The method of claim 11, wherein the quantifiable characteristic is total throughput at the network device.

13. The method of claim 11, wherein the network device is a first network device, the method comprising comparing the upper boundary trend and the lower boundary trend for the first network device with an upper boundary trend and a lower boundary trend for a second network device, and outputting a ranking indicating that the first network device experienced more congestion than the second network device during the time window based on the comparison.

14. The method of claim 11, comprising:
 identifying, for a first set of measurements in the sets of measurements, an upper-quartile and a lower-quartile;
 determining a boundary offset based on the upper-quartile and the lower-quartile;
 wherein the upper boundary is determined based on the upper-quartile and the boundary offset; and
 wherein the lower boundary is determined, based on the lower-quartile and the boundary offset.

15. The method of claim 14, comprising calculating the boundary offset as the upper-quartile less the lower-quartile, multiplied by a constant.

16. The method of claim 11, comprising storing each collected measurement, in association with an identifier for the respective measurement time, in a first-in first-out buffer.

17. The method of claim 11, wherein each of the plurality of time intervals corresponds to a respective day, and wherein the time window includes a fixed number of days.

18. The method of claim 11, comprising:
 forming a merged set of measurements by combining a first set of measurements for a first time interval within the time window and a second set of measurements for a second time interval within the time window, the first time interval contiguous with the second time interval;
 determining, for the merged set of measurements, a combined upper boundary; and
 verifying that the merged set of measurements does not include outlier measurements greater than the combined upper boundary.

19. The method of claim 11, comprising:
 forming a merged set of measurements by combining a first set of measurements for a first time interval within the time window and a second set of measurements for a second time interval within the time window, the first time interval contiguous with the second time interval;
 determining, for the merged set of measurements, a combined upper boundary;
 identifying an outlier measurement in the merged set of measurements that is greater than the combined upper boundary; and
 identifying, responsive to identification of the outlier measurement, a false-positive for congestion during the time window.

20. The method of claim 11, comprising excluding, from the selected two or more sets of measurements, a first set of measurements corresponding to a first time interval, responsive to a determination that the network device was not experiencing congestion during the first time interval.

* * * * *